United States Patent [19]

Lippmann et al.

[11] Patent Number: 4,882,572
[45] Date of Patent: Nov. 21, 1989

[54] ELECTRONIC RANGE INDICATOR FOR A MOTOR VEHICLE

[75] Inventors: Raymond Lippmann, Ann Arbor; Michael J. Schnars, Clarkston, both of Mich.

[73] Assignee: Delco Electronics Corporation, Kokomo, Ind.

[21] Appl. No.: 306,122

[22] Filed: Feb. 6, 1989

[51] Int. Cl.$^4$ .............................................. B60Q 1/00
[52] U.S. Cl. ..................................... 340/456; 74/866; 116/28.1; 200/61.88; 340/438
[58] Field of Search .................. 340/438, 456; 364/424.1; 200/61.88; 192/0.092, 3.58, 4 A; 180/70.1; 116/28.1; 74/DIG. 7, 473 R, 866

[56] References Cited

U.S. PATENT DOCUMENTS

| | | | |
|---|---|---|---|
| 4,037,196 | 7/1977 | Atkinson et al. | 340/456 |
| 4,100,530 | 7/1978 | den Brinker et al. | 340/456 |
| 4,155,068 | 5/1979 | Zajichek | 200/61.88 |
| 4,199,747 | 4/1980 | Miller et al. | 340/456 |
| 4,498,359 | 2/1985 | Hara | 116/28.1 |
| 4,610,179 | 9/1986 | Parker | 200/61.88 |

Primary Examiner—Joseph A. Orsino
Assistant Examiner—Brent A. Swarthout
Attorney, Agent, or Firm—Mark A. Navarre

[57] ABSTRACT

An electronic range indicator apparatus in which a switch array powered by the vehicle ignition voltage is used to indicate the selected transmission range during both on and off periods of the vehicle. During on periods of the vehicle, the ignition voltage is transmitted through the closed contacts (if any) of the switch array, and an electronic control module decodes the output of the switch array and lights the indicator indicia corresponding to the selected range. During off periods of the vehicle, the ignition feed to the switch array is open circuited. In such case, the control module intermittently reverses the potential across the switch array, and lights the appropriate indicator indicia using a reverse logic decode scheme.

7 Claims, 2 Drawing Sheets

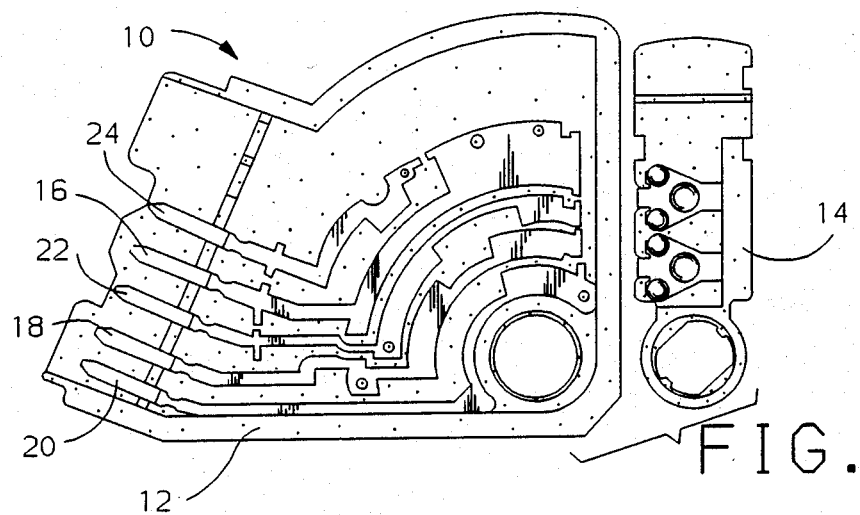
FIG. 2
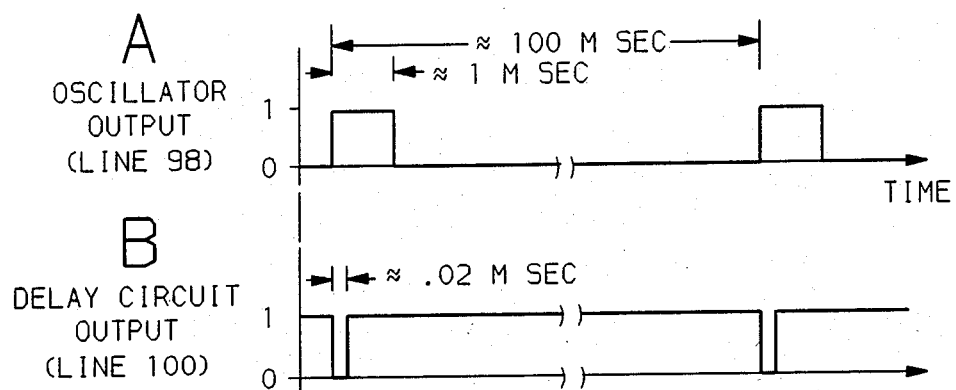
A OSCILLATOR OUTPUT (LINE 98)
≈ 100 M SEC
≈ 1 M SEC
B DELAY CIRCUIT OUTPUT (LINE 100)
≈ .02 M SEC
FIG. 3
|  |  | A | B | C | D | IGN |
|---|---|---|---|---|---|---|
| I | P | 1 | 1 | 1 | 0 | 1 |
|  | R | 1 | 1 | 0 | 1 | 1 |
|  | N | 0 | 1 | 0 | 0 | 1 |
|  | D | 0 | 0 | 0 | 0 | 1 |
|  | D2 | 0 | 0 | 1 | 0 | 1 |
|  | 1 | 1 | 0 | 1 | 0 | 1 |
| II | P | 0 | 0 | 0 | X | 0 |
|  | R | 0 | 0 | 1 | X | 0 |
|  | N | 1 | 0 | 1 | X | 0 |
|  | D | 1 | 1 | 1 | X | 0 |
|  | D2 | 1 | 1 | 0 | X | 0 |
|  | 1 | 0 | 1 | 0 | X | 0 |
DECODER TRUTH TABLE
FIG. 4

ELECTRONIC RANGE INDICATOR FOR A MOTOR VEHICLE

This invention relates to an electronic apparatus for indicating the selected range of a motor vehicle transmission, and more particularly to an indicator which operates during both on and off periods of the vehicle.

BACKGROUND OF THE INVENTION

The selected range of a motor vehicle transmission is typically performed with a pointer which is mechanically driven by an operator manipulated transmission range selector. Electronic indicators have also been used, as for example, on the 1985 Buick, Oldsmobile and Cadillac vehicles; in such vehicles, a switch array powered by battery or ignition voltage is employed to detect the position of the range selector.

SUMMARY OF THE PRESENT INVENTION

The present invention is directed to an electronic range indicator apparatus in which a switch array powered by the vehicle ignition voltage is used to indicate the selected transmission range during both on and off periods of the vehicle. During on periods of the vehicle, the ignition voltage is transmitted through the closed contacts (if any) of the switch array and an electronic control module decodes the output of the switch array and lights the indicator indicia corresponding to the selected range. During off periods of the vehicle, the ignition feed to the switch array is open circuited. In such case, the control module intermittently reverses the potential across the switch array and lights the appropriate indicator indicia using an inverse logic decode scheme.

BRIEF DESCRIPTION OF THE DRAWINGS

FIG. 2 is a diagram of a switch array used in connection with the indicator apparatus of FIGS. 1a and 1b.

FIG. 3 is a graph depicting the operation of the indicator apparatus of FIGS. 1a and 1b during off periods of the vehicle.

FIG. 4 is a truth table corresponding to the switch array and indicator apparatus of this invention.

DETAILED DESCRIPTION OF THE DRAWINGS

Figure 1A:
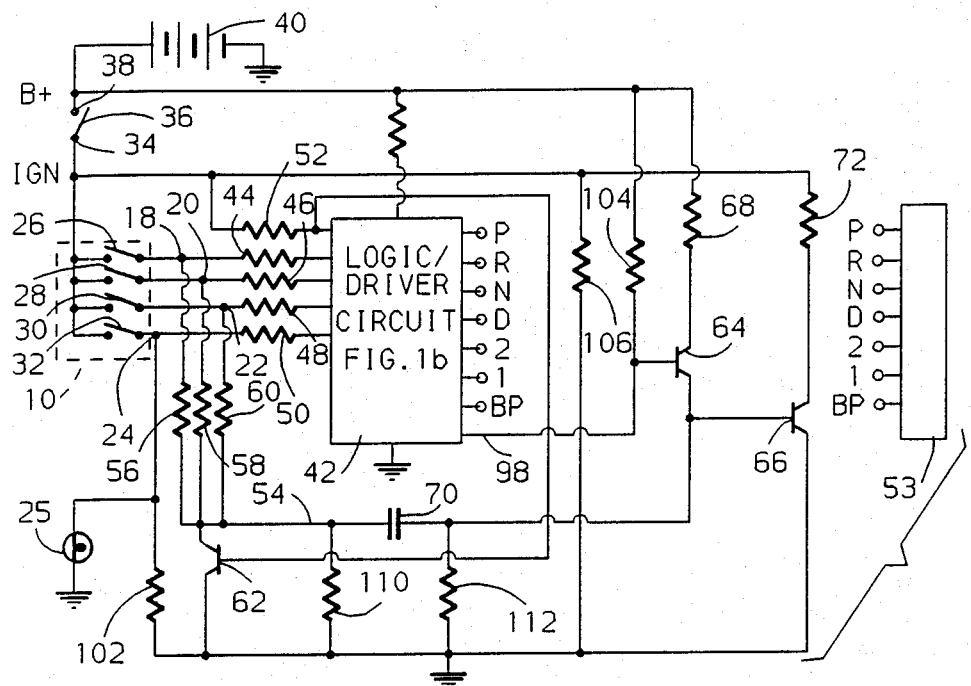
FIGS. 1a and 1b form a circuit diagram of the indicator apparatus of this invention.

Referring to FIGS. 1a and 2, the reference numeral 10 generally designates an electronic switch array for detecting the park (P), reverse (R), neutral (N), drive (D), second (2) and first (1) ranges of a three-speed motor vehicle automatic transmission, not shown. The switch array is preferably mounted on the case of the transmission; the contact member 12 is stationary within the switch housing, not shown, and the contact member 14 is rotatably driven by the transmission range selector, also not shown.

Vehicle ignition voltage (IGN) is supplied to terminal 16 of contact member 12 and the logical outputs A, B, C and D are generated at terminals 18, 20, 22 and 24, respectively. The D output also controls the operation of the vehicle back up lamp circuit as indicated by the lamp 25. In practice, the switch array 10 is also used to inhibit operation of the engine cranking motor when the range selector is in a position other than Park or Neutral.

The metallic patterns on the contact members 12 and 14 are brought into successive engagement with operator manipulation of the range selector to define a predefined relationship between the range selector position and the logical outputs A, B, C and D. Section I of the truth table set forth in FIG. 4 depicts such relationship, a "1" indicating a closed switch and a "0" indicating an open switch. Referring specifically to FIG. 4, the P position of the range selector is designated by an ABCD logical output state of 1110. Similarly, the R position is designated by an ABCD logical output state of 1101, the N position is designated by an ABCD logical output state of 0100, the D position is designated by an ABCD logical output state of 0000, the 2 position is designated by an ABCD logical output state of 0010 and the 1 position is designated by an ABCD logical output state of 1010. Any output logic combination which is generated between the P, R, N, D, 2 and 1 detent positions of the range selector results in a state other than those set forth above; such states are undefined and no range indication is commanded.

The switch 10 is schematically depicted in FIG. 1a as an array of four normally open switches 26, 28, 30 and 32, each having one terminal connected to the switched terminal 34 of a conventional ignition switch 36. The unswitched terminal 38 of ignition switch 36 is connected directly to the positive terminal of the vehicle storage battery 40, the negative battery terminal being connected to the vehicle ground. The positive battery voltage at ignition switch terminal 38 is designated in FIG. 1 as B+ and the ignition voltage at ignition switch terminal 34 is designated as IGN.

The switch array outputs A, B, C and D and the ignition voltage IGN are connected as inputs to a LOGIC/DRIVER CIRCUIT 42 via resistors 44, 46, 48, 50 and 52. The LOGIC/DRIVER CIRCUIT 42 logically decodes the range selector position and drives the display 53 accordingly via the output lines designated P, R, N, D, 2 and 1. A block diagram of the LOGIC/DRIVER CIRCUIT 42 is shown in FIG. 1b as indicated.

The switch array outputs A, B and C are connected to a floating bus 54 via the resistors 56, 58 and 60, respectively. As explained below, the bus 54 is maintained at different voltage potentials depending on the state of the ignition switch 36. During normal operation of the vehicle, the ignition switch 36 is closed and the bus 54 is maintained at a normally low potential via the transistor 62. In this state, the relationship between the range selector position and the logic levels of switch outputs A, B, C and D is as shown in section I of the FIG. 4 truth table, where "1" corresponds to a high logic voltage and "0" corresponds to a low logic voltage; note that the IGN input is always "1" in section I.

During off periods of the vehicle, the ignition switch 36 is open. In such case, the transistor 62 is nonconductive and the transistors 64 and 66 are intermittently biased conductive by the LOGIC/DRIVER CIRCUIT 42 to (1) raise the bus 54 to a normally high potential (B+) through resistor 68 and capacitor 70, and (2) lower the ignition switch terminal 34 to a normally low (ground) potential through resistor 72. During the initial portion of the conductive periods of transistors 64 and 66, the relationship between the range selector position and the logic levels of switch outputs A, B and C is as shown in section II of the FIG. 4 truth table; in this instance, note that the IGN input is "0".

Figure 1B:
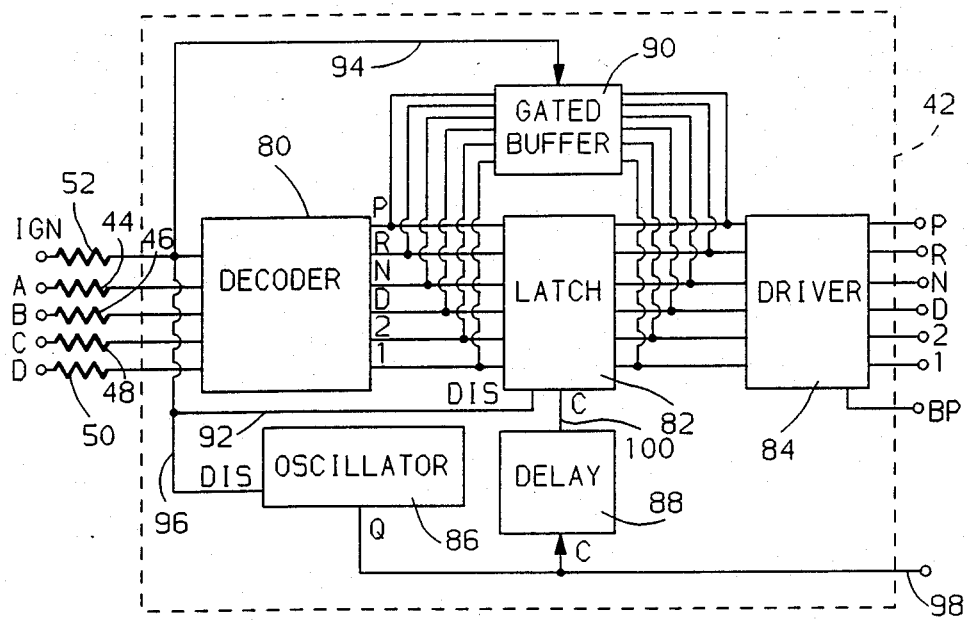

Referring to FIG. 1b, the LOGIC/DRIVER CIRCUIT 42 comprises a decoder 80, a latch 82, a display driver 84, an oscillator (OSC) 86, a delay circuit 88 and a gated buffer 90. Each is a conventional circuit element, well understood by those skilled in the electronic art. The ignition signal and the switch outputs A, B, C and D are applied as inputs to the decoder 80, which recognizes the logical input combinations corresponding to the P, R, N, D, 2 and 1 positions of the range selector as defined in sections I and II of the truth table of FIG. 4. The decoded outputs P, R, N, D, 2 and 1 are applied as inputs to the driver 84 via the gated buffer 90 or the latch 82. During normal operation of the vehicle, the ignition switch 36 is closed to disable the latch 82 via line 92 and to enable the buffer 90 via line 94, to thereby transfer the output data of decoder 80 to driver 84. During off periods of the vehicle, the ignition switch 36 is open and the latch 82 is periodically clocked as described below to transfer the output data of decoder 80 to driver 84.

The driver circuit 84 responds to the input data by developing suitable drive signals for the display 53 to activate the indicia corresponding to the position of the transmission range seeector. In the illustrated embodiment, the display 53 is a liquid crystal display and the driver 84 develops a suitable drive signal for the display backplane, designated as BP.

The ignition signal IGN is additionally applied to the disable (DIS) input of oscillator 86 via line 96, thereby maintaining its output Q on line 98 at a logic zero level during normal operation of the vehicle when the ignition switch 36 is closed. When the ignition switch 36 is open, the oscillator 86 produces a square wave output having a period of approximately 10 Hz and a pulse width of approximately 1 msec, as illustrated in Graph A of FIG. 3. The Q output on line 98 is supplied as an output for controlling the operation of transistors 64 and 66 as described below and as an input to the clock terminal (C) of delay circuit 88. The delay circuit 88, which may be a conventional multivibrator or one-shot, produces a rising edge at its Q output on line 100 for clocking the latch 82 approximately 20 usec following the rising edge of the oscillator signal on line 98, as illustrated in Graph B of FIG. 3.

Referring again to FIG. 1, the operation of the illustrated circuit is substantially as follows. When the ignition switch 36 is closed, the transistor 62 is forward biased via resistor 52 to maintain the switch outputs A, B and C at a normally low potential. The resistor 102 performs the same function with respect to switch output D. A closed switch 26, 28, 30, 32 of switch array 10 pulls the corresponding output A, B, C, D to a high potential through the closed ignition switch 36 and the decoder 80 decodes the range selector position in accordance with section I of the truth table of FIG. 4. The decoded position is applied to the driver 84 via buffer 90 to activate the appropriate segments of the display 53. The output of oscillator 86 on line 98 remains low and transistors 64 and 66 are biased off by the operation of circuit 42 and pull-down resistor 112, respectively.

When the ignition switch 36 is opened, the ignition switch terminal 34 is pulled low through the resistor 106 to discharge capacitive ignition loads, if any. As a result, transistor 62 is biased off and the oscillator 86 is enabled to periodically pulse line 98 to a high logic level as illustrated in Graph A of FIG. 3 to forward bias the transistors 64 and 66. As indicated above, transistor 64 pulls the bus 54 substantially to positive battery voltage B+ via resistor 68 and capacitor 70 and transistor 66 pulls the ignition switch terminal 34 substantially to ground potential via resistor 72.

In the interval during which the capacitor 70 is charging, the outputs A, B and C are normally high and a closed switch 26, 28, 30 of switch array 10 pulls the corresponding output A, B, C to a low potential through resistor 72 and transistor 66. The decoder 80 decodes switch outputs A, B and C in accordance with section II of the truth table of FIG. 4, and the delay circuit 88 clocks the latch 82 to apply the decoder output data to the driver circuit 84. The switch output D is maintained at a normally low level via resistor 102 regardless of the state of the ignition switch due to the presence of back up lamp 25 and is not used by the decode scheme, as indicated by the designation X in section II of the truth table.

The 20 usec delay of delay circuit 88 is imposed to allow adequate time for the transistors 64 and 66 to become fully conductive and for the ignition and bus voltages to reach their pulsed levels. The resistors 56, 58 and 60 are sized such that the worst case (fastest) RC time constant (switches 26, 28 and 30 closed) will be at least as great as the delay interval of 20 usec. Resistor 110 provides a charge path to ground in the event that the switches 26, 28 and 30 are all open. Thus, the capacitor 70 becomes charged substantially to the B+ voltage some time after the decoded switch data is captured by latch 82 and the bus 54 falls substantially to ground potential.

At the falling edge of each oscillator pulse, the transistors 64 and 66 are biased off and the capacitor 70 discharges through the resistors 110 and 112 and if a switch 26, 28 or 30 is closed, the serial combination of resistor 106 and resistors 56, 58 or 60. In any case, the time between the oscillator pulses is sufficiently long to fully discharge capacitor 70 prior to the rising edge of the next pulse. The periodic charge/discharge operation of the capacitor 70 serves to reverse the DC potential seen across the contacts of switches 26, 28 and 30 during the off periods of the vehicle to thereby prevent a net charge migration and consequent degradation of the switch contacts. The capacitor 70 also acts as an open circuit to the DC battery voltage in the event of a failure of the transistors 62 or 64.

While this invention has been described in relation to the illustrated embodiment, it is expected that various modifications thereto will occur to those skilled in the art. In this regard, it will be understood that devices incorporating such modifications may fall within the scope of this invention, which is defined by the appended claims.

The embodiments of the invention in which an exclusive property or privilege is claimed are defined as follows:

1. In a motor vehicle having a selector mechanism adapted to be positioned by a vehicle operator for selecting a desired transmission range, and position detecting means including at least one limit switch having input and output terminals which are electrically connected or disconnected depending on the position of said selector mechanism, apparatus for providing a continuous electronic indication of the selector mechanism position, comprising:

on state means operative during on periods of the vehicle to connect said input terminal to a relatively high potential system voltage which is present only during on periods of the vehicle, while biasing said output terminal toward a lower voltage which is overridden by said high potential system voltage when the limit switch is closed to connect said input and output terminals;

off state means operative during off periods of the vehicle to intermittently connect said input terminal to said lower voltage, while biasing said output terminal toward a higher voltage which is overridden by said lower voltage when the limit switch is closed to connect said input and output terminals, thereby to logically invert the output terminal voltage as compared with that established during on periods of the vehicle;

decoding means for developing output data which identifies the selector mechanism position as a function of said system voltage and the voltage at the output terminal of said limit switch;.and driver means effective (1) during on periods of the vehicle for activating a display device in accordance with the output data continuously generated by said decoder means, and (2) during off periods of the vehicle for activating said display device only in accordance with the output data generated by said decoder means during the intermittent periods of operation of said off state means.

2. The apparatus set forth in claim 1, wherein said driver means comprises:

latch means effective during off periods of the vehicle for storing the output data generated by said decoder means, and periodically updating such stored data during the intermittent periods of operation of said off state means.

3. The apparatus set forth in claim 2, wherein said driver means further comprises:

timing means for triggering the updating of said stored data by said latch means a predetermined period of time following the initiation of the connections effected by said off state means.

4. The apparatus set forth in claim 1, wherein the vehicle includes a storage battery having positive and negative terminals, and the on state means comprises:

an ignition switch connecting the positive terminal of said storage battery to the input terminal of said limit switch; and transistor means connecting the negative terminal of said storage battery to the output terminal of said limit switch.

5. The apparatus set forth in claim 1, wherein the vehicle includes a storage battery having positive and negative terminals, and the off state means comprises:

first intermittently conductive transistor means connecting the negative terminal of said storage battery to the input terminal of said limit switch; and second intermittently conductive transistor means connecting the positive terminal of said storage battery to the output terminal of said limit switch.

6. The apparatus set forth in claim 5, wherein the off state means further comprises:

capacitive means connected between the second intermittently conductive transistor and the output terminal of said limit switch for periodically reversing the DC potential across the first and second terminals of said limit switch during the off period of said vehicle, thereby to avoid a substantial net charge migration between such first and second terminals.

7. In a motor vehicle having a selector mechanism adapted to be positioned by a vehicle operator for selecting a desired transmission range, and position detecting means including at least one limit switch having input and output terminals which are electrically connected or disconnected depending on the position of said selector mechanism, apparatus for providing a continuous electronic indication of the selector mechanism position, comprising:

a storage battery having positive and negative terminals;

off state means including first and second transistor means connecting the negative and positive terminals of said storage battery to the input and output terminals, respectively, of said limit switch, and means for intermittently biasing said transistors conductive during off periods of said vehicle;

on state means operative during on periods of the vehicle including first and second switch means connecting the positive and negative terminal of said storage battery to the input and output terminals, respectively, of said limit switch;

decoding means for developing output data which identifies the selector mechanism position as a function of the on and off state means and the storage battery voltage at the output terminal of said limit switch; and driver means effective (1) during on periods of the vehicle for activating a display device in accordance with the output data continuously generated by said decoder means, and (2) during off periods of the vehicle for activating said display device only in accordance with the output data generated by said decoder means during the intermittent periods of conduction of said first and second transistor means.

* * * * *